(12) United States Patent
Feuer

(10) Patent No.: US 8,125,982 B2
(45) Date of Patent: *Feb. 28, 2012

(54) PROVIDING REAL-TIME VOICE COMMUNICATION BETWEEN DEVICES CONNECTED TO AN INTERNET PROTOCOL NETWORK AND DEVICES CONNECTED TO A PUBLIC SWITCHED TELEPHONE NETWORK

(75) Inventor: Donald S. Feuer, San Clemente, CA (US)

(73) Assignee: Centre One, San Clemente, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/360,028

(22) Filed: Jan. 26, 2009

(65) Prior Publication Data

US 2009/0129566 A1 May 21, 2009

Related U.S. Application Data

(63) Continuation of application No. 11/381,417, filed on May 3, 2006, now Pat. No. 7,486,667, which is a continuation of application No. 09/479,736, filed on Jan. 7, 2000, now Pat. No. 7,068,668.

(51) Int. Cl.
*H04L 12/56* (2006.01)
*H04J 1/16* (2006.01)

(52) U.S. Cl. ..... 370/352; 370/401; 370/252; 379/88.17; 709/203

(58) Field of Classification Search .......... 370/352–356, 370/400, 401, 252; 379/88.17; 709/203
See application file for complete search history.

(56) References Cited

U.S. PATENT DOCUMENTS

| 5,608,786 | A | 3/1997 | Gordon |
| 5,726,984 | A | 3/1998 | Kubler et al. |
| 5,742,596 | A | 4/1998 | Baratz et al. |
| 5,742,905 | A | 4/1998 | Pepe et al. |

(Continued)

FOREIGN PATENT DOCUMENTS

WO WO97/16007 5/1997

(Continued)

OTHER PUBLICATIONS

Anerousis et al., "TOPS: An Architecture for Telephony over Packet Networks," IEEE Journal on Selected Areas in Communications, vol. 17, No. 1, Jan. 1999, pp. 91-108.

(Continued)

*Primary Examiner* — John Pezzlo
(74) *Attorney, Agent, or Firm* — Osha • Liang LLP

(57) ABSTRACT

Systems, methods, and apparatus for providing real-time voice communication between devices connected to an Internet Protocol (IP) network and devices connected to a public switched telephone network (PSTN). In one implementation, the system includes a computer-controlled switch for connection to a local PSTN, for receiving calls from the IP network and the PSTN, and for routing calls to the PSTN and the IP network; and gate interface circuitry connected to the switch and adapted for connection to the IP network. The gate interface circuitry includes gateway circuitry for interfacing the IP network and PSTN voice circuits, and gatekeeper circuitry for performing address translation, admission control, bandwidth management, and zone management. The switch stores at least one PSTN destination address and at least one IP network destination address for each subscriber. The switch routes an incoming call to any one of the destination addresses stored for the subscriber.

2 Claims, 2 Drawing Sheets

U.S. PATENT DOCUMENTS

| | | | |
|---|---|---|---|
| 5,867,495 | A | 2/1999 | Elliott et al. |
| 5,999,518 | A | 12/1999 | Nattkemper et al. |
| 6,069,890 | A | 5/2000 | White et al. |
| 6,104,711 | A | 8/2000 | Voit |
| 6,108,704 | A | 8/2000 | Hutton et al. |
| 6,128,304 | A | 10/2000 | Gardell et al. |
| 6,137,869 | A | 10/2000 | Voit et al. |
| 6,185,288 | B1 | 2/2001 | Wong |
| 6,243,373 | B1 | 6/2001 | Turock |
| 6,252,952 | B1 | 6/2001 | Kung et al. |
| 6,278,707 | B1 | 8/2001 | MacMillan et al. |
| 6,282,574 | B1 | 8/2001 | Voit |
| 6,298,062 | B1 | 10/2001 | Gardell et al. |
| 6,298,064 | B1 | 10/2001 | Christie |
| 6,304,572 | B1 | 10/2001 | Christie |
| 6,359,880 | B1 | 3/2002 | Curry et al. |
| 6,404,764 | B1 | 6/2002 | Jones et al. |
| 6,430,275 | B1 | 8/2002 | Voit et al. |
| 6,452,932 | B1 | 9/2002 | Christie |
| 6,463,052 | B1 | 10/2002 | Christie |
| 6,466,548 | B1 | 10/2002 | Fitzgerald |
| 6,473,429 | B1 | 10/2002 | Christie |
| 6,542,497 | B1 | 4/2003 | Curry et al. |
| 6,546,005 | B1 | 4/2003 | Berkley et al. |
| 6,614,783 | B1 | 9/2003 | Sonesh et al. |
| 6,633,561 | B2 | 10/2003 | Christie |
| 6,665,294 | B2 | 12/2003 | Christie |
| 6,707,810 | B1 | 3/2004 | Neel et al. |
| 6,731,625 | B1 | 5/2004 | Eastep et al. |
| 6,829,234 | B1 | 12/2004 | Kaplan et al. |
| 7,020,132 | B1 | 3/2006 | Narasimhan et al. |
| 7,068,668 | B2 | 6/2006 | Feuer |
| 7,120,139 | B1 * | 10/2006 | Kung et al. ............. 370/352 |
| 2001/0005382 | A1 | 6/2001 | Cave et al. |
| 2003/0007621 | A1 | 1/2003 | Graves et al. |
| 2003/0095542 | A1 | 5/2003 | Chang et al. |
| 2004/0228336 | A1 | 11/2004 | Kung et al. |
| 2009/0109959 | A1 * | 4/2009 | Elliott et al. ............ 370/352 |

FOREIGN PATENT DOCUMENTS

WO     WO97/48050     12/1997

OTHER PUBLICATIONS

Hamdi et al., "Voice Service Interworking for PSTN and IP Networks," IEEE Communications Magazine, May 1999, pp. 104-111.

* cited by examiner

PROVIDING REAL-TIME VOICE COMMUNICATION BETWEEN DEVICES CONNECTED TO AN INTERNET PROTOCOL NETWORK AND DEVICES CONNECTED TO A PUBLIC SWITCHED TELEPHONE NETWORK

RELATED APPLICATIONS

This application is a continuation application of, and claims the benefit under 35 U.S.C. §120 to, U.S. patent application Ser. No. 11/381,417, which was filed on May 3, 2006, which is a continuation of, and claims the benefit of the filing date of, U.S. patent application Ser. No. 09/479,736, filed Jan. 7, 2000, issued as U.S. Pat. No. 7,068,668, the entire contents of which are hereby incorporated by reference.

BACKGROUND OF THE INVENTION

1. Field of the Invention

The present invention relates generally to improvements in voice communication systems and more particularly pertains a new and improved method and apparatus for interfacing a public switched telephone network (PSTN) with an Internet Protocol (IP) network to provide real-time voice communication and messaging services over the two networks.

2. Description of the Related Art

Voice communication over Internet Protocol networks has been accomplished by using computers with sound cards to communicate with other computers with sound cards connected to the IP network through a service provider. Such devices have been unsatisfactory in that the PSTN is excluded from the communication loop.

Attempts have been made to integrate the public switched telephone network into the Internet Protocol network. Such attempts have been limited to messaging systems such as described in U.S. Pat. No. 5,608,786, granted Mar. 4, 1997, to Allistair T. Gordon for A UNIFIED MESSAGING SYSTEM AND METHOD, the disclosure of which is incorporated herein by reference. Although the system and method described in this '786 patent utilize both the Internet Protocol network and public switch telephone network, it does not provide for real-time voice communication between units connected to the Internet Protocol network and the public switch telephone network.

Voice technology, which has been around for over one hundred years, has been evolving since the first phone call was made. The standard public switched telephone network (PSTN) which is basically a large circuit-switched network, is truly ubiquitous, simple to use, dependable and pervasive.

Voice technology today involves both analog and digital transmission and signaling. Human speech and everything we hear is in analog form. The telephone network was based upon an analog infrastructure. Thus, early analog phones utilized a carbon microphone, a battery, an electromagnet and an iron diaphragm. Connecting these components together produced a method of transporting voice. Although analog communication is ideal for human communication, it is neither robust nor an efficient method of transmitting information.

Digital transmission of information is much more desirable. Digital samples comprise one and zero bits. It is much easier to separate digital samples from line noise. Thus, when digital signals are regenerated, a clean sound can be maintained. As a result of the benefits of digital representation of the analog voice signals, pulse code modulation techniques were integrated into the telephone network. Pulse code modulation (PCM) converts analog sound into digital form by sampling the analog sound so many times per second and converting the sound into a numeric code. After the analog wave form is sampled, it is converted into a discrete digital form, as samples represented by code that indicates the amplitude of the wave form at the instant the sample was taken. A standard telephone form of PCM uses 8 bits for the code and a logarithm compression method that assigns more bits to lower amplitude signals. A standard transmission rate of 64K bits per second is used for one channel of telephone digital communication. The two basic variations of 64K bps PCM are μ-law and A-law. Both methods are similar in that they both use logarithmic compression to achieve 12-13 bits of linear PCM quality with 8 bits. They differ in relatively minor compression details. North America uses μ-law modulation. Europe uses A-law modulation. Another compression method that is often used today is an adaptive differential pulse-code modulation (ADPCM). A commonly used form of ADPCM is ITU-T G.726, which encodes by using 4 bit samples giving a transmission rate of 32K bps. Unlike PCM, the 4 bits do not directly encode the amplitude of speech, but rather the differences in amplitude as well as the rate of change of that amplitude employing rudimentary linear prediction.

Both PCM and ADPCM are examples of wave form coder-decoders (CODECs), compression techniques that exploit redundant characteristics of the wave form itself. Many variations of CODEC compression techniques have been suggested, some of which have been written into standards promulgated by the ITU-T in its G-series recommendations, for example, such as G.711, G726, G728, G729, and G723.1.

Although these compression techniques seem to have successfully addressed the problem of noise on the propagation medium, delay is still a major consideration in today's telephony networks. There are basically two types of delay, propagation delay and handling delay. Propagation delay is caused by the speed of light in a fiber or copper based network. Handling delay is caused by devices that handle the voice information along the voice path. The speed of light in a vacuum is 186,000 miles per second. Electrons travel 100,000 miles per second in copper. A fiber network half way around the world (13,000 miles) only induces a one way delay of about 70 milliseconds. Such a delay is almost imperceptible to the human ear. But these propagation delays in combination with handling delays can cause noticeable speech degradation. Handling delays become a large issue in packetized environments, which are utilized in Internet Protocol networks. A typical packetizer such as made by Cisco Systems, for example, generates a speech frame every 10 milliseconds. Two of these speech frames are then placed into one packet and a real-time transport protocol header is then attached to the packet.

Another problem experienced in traditional toll networks is echo. Echo is normally caused by mismatch in impedance between the 4-wire network switch conversion to a 2-wire local loop. Although hearing your own voice in the receiver is common and reassuring to a speaker, hearing your own voice in a receiver longer then 2.5 milliseconds will cause interruptions and breaks in the conversation. As a result, echo in the standard PSTN is controlled with echo cancelers and a tight control on impedance mismatches at the common reflection points. In packet based networks, echo cancelers are built into the low bit rate CODECS.

Various types of in-band and out of band signaling methods are used in today's telecommunication networks. A common method of in-band signaling is the use of single or multi-frequency tones. A common method of out of band signaling is integrated services digital network (ISDN) which used the D channel for call set up. Out of band signaling is what it says. It uses a separate channel for signaling outside the voice band.

Facsimile machines that are commonly used today implement ITU recommended protocols T.30 and T.4. The T.30 protocol describes the formatting of non-page data such as messages that are used for capabilities and negotiation. The T.4 protocol describes formatting of page image data. In a PSTN, the fax machines synchronize their transmissions end to end and negotiate page by page. In a packet-based network like in an IP network, the T.30 protocol engines are de-coupled and demodulated, allowing for delays inherent in the network.

Another ITU-T specification of considerable importance is H.323 which is utilized for transmitting multimedia (voice, video, and data) across a local area network which can be an IP network or a network of any other protocol. H.323 describes H.323 terminals, H.323 MCUs, H.323 gateways, and H.323 gatekeepers. An H.323 gatekeeper for example, performs address translation, admission control, bandwidth management and zone management. An H.323 gateway provides a gate between an IP protocol network and the PSTN as well as any other H.320 terminals, V.70 terminal, H.324 terminal, and any other speech terminals. The H.323 protocol is used for audio, video and data applications and system control.

Packet voice applications readily lend themselves to transmitting voice over IP networks, thus presenting a fundamental change in the PSTN approach of offering telephony services. One of the main reasons packet telephony has been gaining interest is the cost saving available. By integrating the voice and the data networks into one network considerable cost savings can be achieved. A voice over IP network permits toll bypass which allows the customers to replace their tie lines that currently hook up their PBX to PBX networks, and route their voice calls across their existing data structure utilizing the IP network.

Turning now to FIG. 1, use of the present invention in seamlessly merging a PSTN and IP network for voice communication is illustrated. The global Internet system 13 is an Internet Protocol (IP) network. To use this IP network a subscriber typically contracts with a commercial access or service provider, obtains an Internet address and the capability to thereby send and receive e-mail by way of the IP network, and perform other functions supported by the IP network. The subscriber typically uses a personal computer and modem to contact the service provider over a public switched telephone network or any other convenient communication link such as cable or DSP line. Once connected to the IP network 13 the subscriber may communicate with any other subscribers connected to the network, which subscribers may be located in a host of different countries.

Local PSTN networks 15 and 17 exist throughout the United States and throughout the world. These networks are administered by local and long distance telephone companies. Access to the local PSTN networks 15 and 17 is also by contract between a subscriber and the PSTN and the local telephone company operating the PSTN. Typically the local PSTNs are connected over long distance trunks 18, which may consist of anything from wire lines and optical fiber to wireless satellite links.

A typical PSTN 15 would interconnect a plurality of phones 39, 27 by wireline connections 47 and 31 respectively, a plurality of faxes 41 by wireline connections 49, and perhaps a wireless communication network 29 by way of trunk lines 33. The wireless communication network 29 would communicate with a plurality of cell phones 35 and pagers 37 over wireless links 43 and 45.

In addition to these units, a local PSTN 17 for example, besides connecting standard telephone sets 93 over wire lines 97 and faxes 91 over wire lines 95 may connect to private branch exchange (PBX) units 71 over trunk lines 73. The private branch exchange 71 is typically located at a business sight. It would connect a plurality of telephone units 75, 77 and 79 over wire lines 81, 83 and 89 to the local PSTN 17.

All the units connected to the local PSTNs 17 and 15 are capable of communicating with any other units connected to these PSTNs because the local PSTNs are in turn connected together by trunk lines 18. This is a traditional telephone network.

The IP network 13 is designed for interconnecting computers for communication purposes. Access to the IP network 13 is through a service provider. A typical subscriber like computer 59 for example, would connect to the IP network 13 over a connecting link 61 which may consist of a modem and local telephone line, a digital cable or other means commonly available. The computer subscriber 59 typically pays a monthly access fee to the service provider. Communication between the subscribers to the IP network is usually by e-mail.

Computers with multimedia capability and a voice packetizing program such as Netmeeting for example which is a software program available on the Internet at no charge can communicate with other computers having multi-media and net media capability by voice signaling. Thus computer 63 which has multimedia capability and Netmeeting software could take the voice signals from a phone 65 which is connected by a wireline 67 to computer 63, packetize it into a digital format and transmit it over the modem or cable or DSP line 69 to the IP network 13 where it would be distributed to computer 59, for example, and broken down in computer 59 to a voice message. This system only provides voice communication over the IP network between devices connected to the IP network 13.

SUMMARY OF THE INVENTION

The general purpose of this invention is to provide a system that permits realtime voice communication between devices connected to an Internet Protocol (IP) network and devices connected to a public switched telephone network (PSTN) and provide a variety of communication services desired by a subscriber to the system. To attain this purpose, the present invention utilizes a computer controlled Class 5 switch connected to the PSTN, and gate interface circuitry connected to the switch and the IP network. The gate interface circuitry interfaces the digital data packets of the IP network with the voice circuits of the PSTN and performs address translation, admission control, bandwidth management and zone management between the IP network and the PSTN. The system allows computers with multi-media software, or telephones with IP network interface circuits connected to the IP network to have real-time voice communication with telephones connected to the PSTN, and vice versa.

The system provides message services with the additional feature of converting received voice messages to e-mail messages, converting received facsimile messages to e-mail messages, and converting received e-mail messages to voice messages.

The system can receive an incoming call either from the IP network or the PSTN and simultaneously route the call to a plurality of predesignated destinations, which are modifiable by the subscriber. These destinations may be on the IP network, on the PSTN, or on both the IP network and the PSTN. Additional features such as caller identification are also provided. All these features, and others not mentioned here, are possible as the result of the invention, which seamlessly merges the IP network and PSTN for voice communication.

BRIEF DESCRIPTION OF THE DRAWINGS

The exact nature of this invention, as well as its objects and all of its advantages will be readily appreciated upon consideration of the following detailed description as related to the accompanying drawings in which like reference numerals designate like parts throughout the figures thereof and wherein.

DESCRIPTION OF THE PREFERRED EMBODIMENTS

Figure 1:
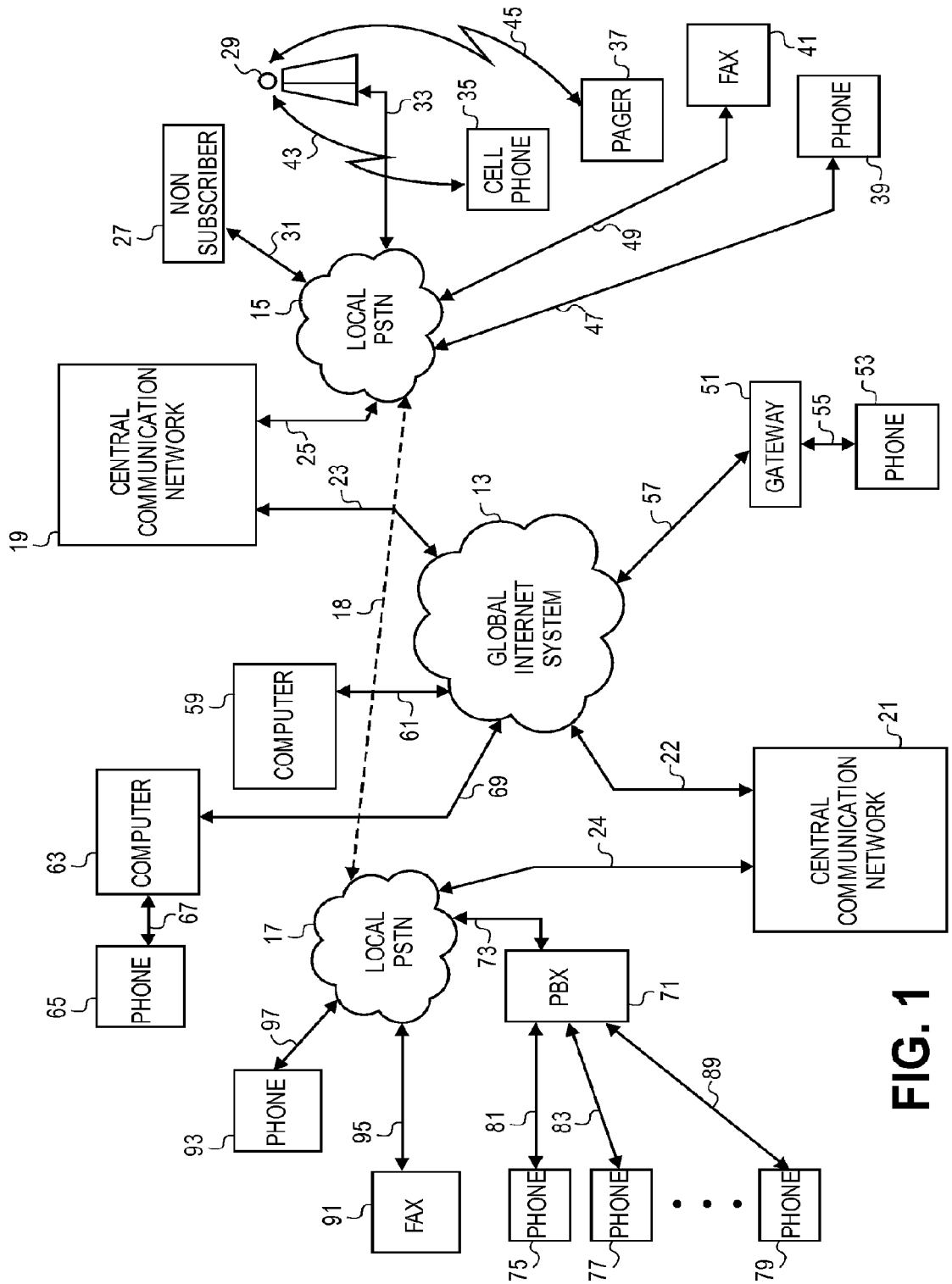
FIG. 1 is a block diagram schematic of the system of the present invention being utilized to integrate a PSTN and IP network.
Figure 2:
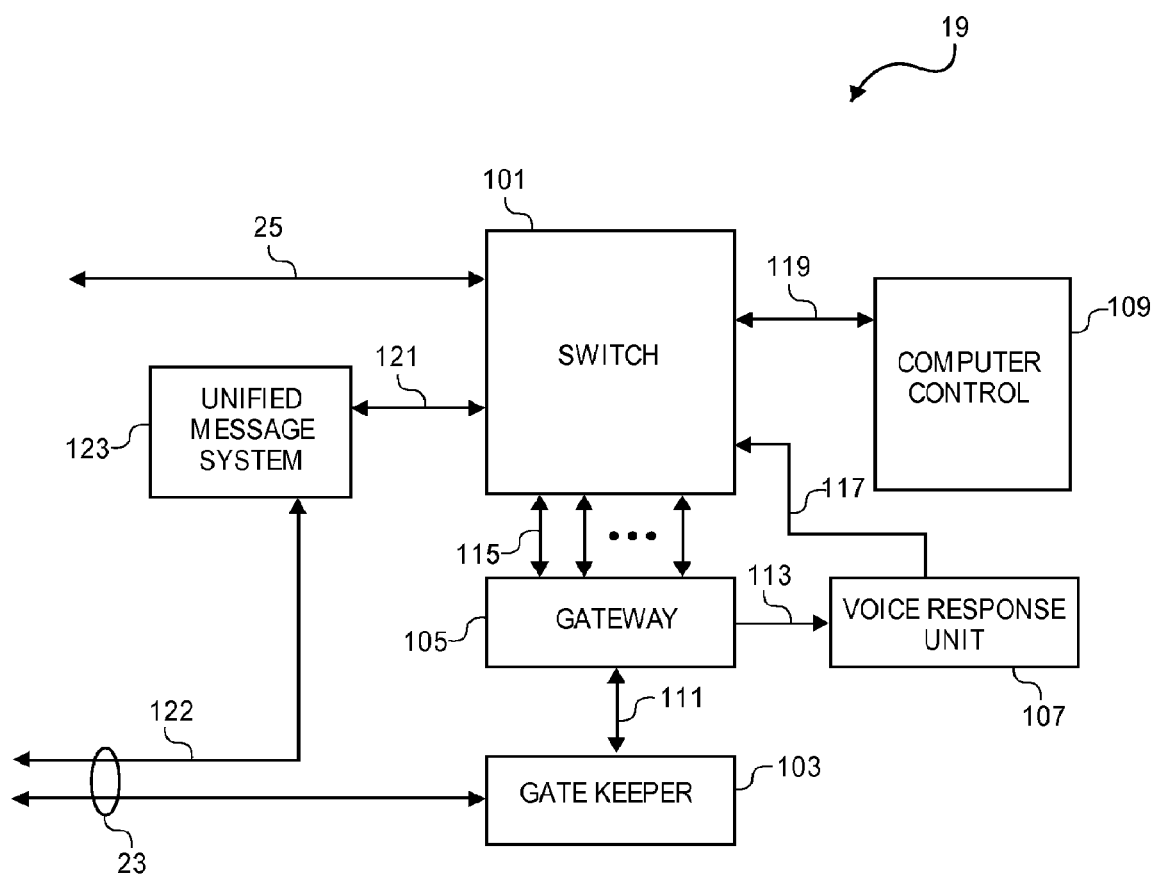
FIG. 2 is a block diagram illustration of the preferred system for interfacing a PSTN and IP network according to the present invention.

The present invention, in order to provide communication between devices connected to the IP network 13 and devices connected to local PSTN networks 15 and 17 provides an interface network 19 which connects a local PSTN network 15 and the IP network 13 by a PSTN link 25 and an IP link 23. Central communication network 19 is capable of directing calls to and from units connected to the PSTN 15 by way of the IP network 13 to any units connected to the IP network 13 throughout the world.

Central communication network 21 may be located in another country, servicing subscribers in that country by connecting its local PSTN network 17 over PSTN links 24 to the IP network 13 over IP links 22.

Subscribers to the services provided by the central communication networks 19 and 21 would contract with the company administering the central communication network, and obtain a telephone number as well as an IP address if the subscriber did not already have one. A subscriber to the central communication network would then be able to make calls real-time over the IP network 13, anywhere in the world to any units connected to the IP network and any units connected to the PSTN networks 15 and 17. In addition, a subscriber to the central communication network has the ability to send and receive messages, send and receive facsimile messages over the IP network to any destination anywhere in the world attached to the IP network or attached to a PSTN network.

In addition, a subscriber to the central communication network receives special services such as the "follow me" service. This service allows a subscriber to receive incoming calls simultaneously at a plurality of numbers pre-programmed into the system which could for example be a base phone number 39, a cell phone 35, pager 37 and a computer 59, located anywhere in the world. If the computer 59 is connected to the IP network, the call is received in real-time as a voice signal. If the computer is not connected, the central communication network provides for the storing of messages that may them be retrieved as voice messages or e-mail messages.

In addition, e-mail messages that are received over the IP network may be converted to speech format, allowing the subscriber to listen to his e-mail messages rather then read them. The subscriber may also send voice e-mail messages to units connected to the IP network.

Additional features provided by the system will be further described in conjunction with the structure and function of the central communication network 19.

The central communication network has as its backbone a circuit switch 101 which is capable of Class 5 switching of PSTN lines such as T-1 lines 115 or T-1 or DS3 lines 25, for example. Manufactures such as Priority Call Management Inc., Excell Inc. and Magellan Inc., make switches that are capable of performing this function. The switch is controlled by a computer control 109 which directs its operation over control lines 119 in a manner that is well know in the art. The T-1 or DS3 lines 25 of switch 101 are connected to the local PSTN network.

The other T-1 lines 115 are connected to a gateway 105 which converts packetized digital voice data to PSTN format digital voice to be provided to the switch 101 over T-1 lines 115, and vice versa. The gateway 105 takes PSTN digital voice and packetizes it for transmission to a gatekeeper 103 and out to the IP network 13 over trunks 23. The gatekeeper 103 typically performs addresses translation, admission control, bandwidth management and zone management functions. Equipment to perform the functions of the gateway 105 and the gatekeeper 103 are available from manufacturers such as Cisco Systems, Inc., which manufactures the Cisco 2600 and Cisco 3600, for example.

A voice response unit 107 is connected between the gateway 105 by lines 113 and the switch 101, by lines 117. Voice response unit 107 takes the depacketized voice signal received at the gateway 105 and converts it to digital tones for use by the switch 101.

A unified message system 123 consists of a computer controlled message unit that is connected to the switch 101 by lines 121 and the IP network 13 by lines 122. Unified messaging platforms that would be suitable for use in the invention are readily available on the market.

The unified message system is set up to take voice messages and facsimile messages from the switch 101 and convert them to e-mail messages which can then be transmitted over lines 122 to the IP network 13. In addition, the unified message system can take e-mail messages from the IP network 13 and convert them to voice messages that are then sent through switch 101 to the PSTN network over trunks 25 to a PSTN phone or by T-1 lines 115 to the IP network 13 to a computer on the IP network capable of receiving voice messages, or to a phone 53 connected to the IP network by a gateway 51.

A subscriber to the central communication network can send e-mails to other subscribers who have their e-mail addresses stored in the unified message system 123 simply by keying in the name of the subscriber. A subscriber can send e-mails to non-subscribers 27 by keying in the e-mail address. The unified message system 123 will receive the keyed in tones and convert them to digital data over the IP network 13.

A subscriber to the central communication network 19 has stored in a computer control 109 for switch 101 a plurality of destination addresses which comprise telephone numbers for units hooked up to the PSTN network, such as a base phone number, a cell phone number, pager number, fax number and IP addresses for a computer hooked to the IP network 13. Thus, an incoming call over the PSTN network 15, for example, to the central communication network 19 would be simultaneously routed by switch 101 to all the pre-stored numbers for the subscriber. For example, an incoming call could be routed to the subscriber's computer 59, which is connected to the IP network 13, to the subscriber's base phone 39, to the subscriber's cell phone 35, and to the subscriber's pager 37 at the same time. If there is no response by the computer 59, the cell phone 35, or the base phone 39, to establish a real-time communication link, unified message system 123 takes the message for later delivery in the form of a voice message, an e-mail message or a facsimile message, as directed by the subscriber.

After routing an incoming call to the subscriber's various destinations, the central communication network provides for a caller identification which tells the receiving subscriber the name of the caller. This allows the subscriber to decide whether the call will be picked up or not. If the call is picked up, real-time communication is established. If the call is not picked up, the unified message systems 123 takes a message for later retrieval by the subscriber as desired.

The invention claimed is:

1. A system for providing real-time voice communication between devices connected to an Internet Protocol (IP) network and devices connected to a public switched telephone network (PSTN) having voice circuits, the system comprising:
 a computer controlled switch operable for use by a plurality of subscribers and adapted for connection to a local public switched telephone network, receiving calls from the IP network and the PSTN, and routing calls to the PSTN and the IP network; and
 gate interface circuitry connected to the computer controlled switch and adapted for connection to the IP network, wherein the gate interface circuitry includes gateway circuitry for interfacing between the IP network and the voice circuits of the PSTN, and gatekeeper circuitry for performing address translation, admission control, bandwidth management and zone management between the IP network and the PSTN;
 the computer controlled switch storing, for each subscriber of the plurality of subscribers, at least one destination address on the PSTN and at least one destination address on the IP network, the computer controlled switch being operable to route an incoming call from the IP network or the PSTN for each subscriber of the plurality of subscribers to any one of the destination addresses stored by the computer controlled switch for the subscriber; and
 a voice response unit connected between the gate interface circuitry and the switch for receiving voice signals and converting them to digital tones for the switch,
 wherein the computer controlled switch performs caller identification functions after routing the incoming call.

2. A method of providing real-time voice communication between devices connected to an Internet Protocol (IP) network and devices connected to a public switched telephone network (PSTN) having voice circuits, the method comprising:
 interfacing the digital data signals of the IP network with the voice signals of the PSTN;
 interfacing the control signals of the IP network with the PSTN to perform address translation, admission control, bandwidth management and zone management between the IP network and the PSTN;
 routing calls between the devices connected to the IP network and devices connected to the PSTN;
 maintaining information corresponding to a plurality of subscribers;
 storing for each subscriber of the plurality of subscribers at least one destination address on the PSTN and at least one destination address on the IP network;
 automatically routing an incoming call from the IP network or the PSTN for each subscriber of the plurality of subscribers to any one of the destination addresses stored by the computer controlled switch for the subscriber; and
 performing caller identification functions after routing the incoming call.

* * * * *